US009467641B2

(12) United States Patent
Shimomichi

(10) Patent No.: US 9,467,641 B2
(45) Date of Patent: Oct. 11, 2016

(54) TELEVISION AND ELECTRONIC APPARATUS

(71) Applicant: KABUSHIKI KAISHA TOSHIBA, Tokyo (JP)

(72) Inventor: Tsuyoshi Shimomichi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 400 days.

(21) Appl. No.: 14/199,863

(22) Filed: Mar. 6, 2014

(65) Prior Publication Data

US 2014/0184927 A1    Jul. 3, 2014

Related U.S. Application Data

(63) Continuation of application No. 13/300,466, filed on Nov. 18, 2011, now abandoned.

(30) Foreign Application Priority Data

Dec. 27, 2010 (JP) ................. 2010-291096

(51) Int. Cl.
*F21V 7/04* (2006.01)
*H04N 5/64* (2006.01)
*G02F 1/1333* (2006.01)
(Continued)

(52) U.S. Cl.
CPC .......... *H04N 5/64* (2013.01); *G02F 1/133308* (2013.01); *G02F 1/133608* (2013.01); *G06F 1/1601* (2013.01); *G02F 2001/13332* (2013.01); *G02F 2001/133314* (2013.01); *G02F 2001/133317* (2013.01); *G09F 13/0413* (2013.01)

(58) Field of Classification Search
CPC .......... G06F 1/1601; G02F 1/133608; G02F 1/133308; G02F 2001/133317; G02F 2001/133314; F21V 15/01; G09F 13/0413; G09F 13/0454; H04N 5/64
See application file for complete search history.

(56) References Cited

U.S. PATENT DOCUMENTS 6,480,245 B1    11/2002    Sakamoto et al.
6,966,686 B2    11/2005    Chen
(Continued)

FOREIGN PATENT DOCUMENTS

JP    H07-105709 A    4/1995
JP    H09-090361 A    4/1997
(Continued)

OTHER PUBLICATIONS

First Office Action mailed by Japan Patent Office on Aug. 4, 2015 in the corresponding Japanese Application No. 2014-148814—6 pages.
(Continued)

*Primary Examiner* — Y M Lee
(74) *Attorney, Agent, or Firm* — Knobbe, Martens, Olson & Bear LLP

(57) ABSTRACT

According to one embodiment, an electronic apparatus includes a panel including a first surface and a second surface opposite to the first surface, a first metal cover configured to cover the first surface of the panel, and a second metal cover including an opening configured to expose at least a part of the second surface of the panel. The second metal cover is configured to be attached to the first metal cover, surround a circumferential surface of the panel, and be outwardly exposed.

19 Claims, 11 Drawing Sheets

(51) Int. Cl.
*G02F 1/1335* (2006.01)
*G06F 1/16* (2006.01)
*G09F 13/04* (2006.01)

(56) References Cited

U.S. PATENT DOCUMENTS

| | | | |
|---|---|---|---|
| 7,530,723 B2 | 5/2009 | Ohno | |
| 7,578,610 B2 | 8/2009 | Sakamoto et al. | |
| RE41,732 E | 9/2010 | Hasegawa et al. | |
| 8,147,113 B2 | 4/2012 | Hamada | |
| 8,159,629 B2 | 4/2012 | Yamashita et al. | |
| 2003/0103173 A1 | 6/2003 | Satonaka | |
| 2004/0254716 A1 | 12/2004 | Ino et al. | |
| 2006/0055839 A1 | 3/2006 | Hirao et al. | |
| 2006/0164860 A1 | 7/2006 | Muraoka et al. | |
| 2007/0133222 A1 | 6/2007 | Watanabe et al. | |
| 2007/0165425 A1 | 7/2007 | Sakamoto et al. | |
| 2008/0079864 A1 | 4/2008 | Nishimura | |
| 2008/0170412 A1 | 7/2008 | Ohno | |
| 2008/0225202 A1 | 9/2008 | Joo et al. | |
| 2008/0291354 A1 | 11/2008 | Oh | |
| 2008/0297695 A1 | 12/2008 | Sekiguchi et al. | |
| 2009/0015536 A1 | 1/2009 | Takeoka et al. | |
| 2009/0096957 A1 | 4/2009 | Hiyama et al. | |
| 2009/0103282 A1 | 4/2009 | Itaya | |
| 2009/0237588 A1 | 9/2009 | Takenaka et al. | |
| 2009/0268124 A1 | 10/2009 | Kujiraoka et al. | |
| 2010/0059767 A1 | 3/2010 | Kawasaki et al. | |
| 2010/0066939 A1 | 3/2010 | Ohashi et al. | |
| 2010/0073582 A1 | 3/2010 | Konno et al. | |
| 2010/0073959 A1 | 3/2010 | Hamada | |
| 2010/0245709 A1 | 9/2010 | Sugimori et al. | |
| 2010/0277664 A1 | 11/2010 | Kim et al. | |
| 2011/0141389 A1 | 6/2011 | Tabor | |
| 2011/0273631 A1* | 11/2011 | Hayashi | G02B 6/0091 348/790 |
| 2012/0162546 A1 | 6/2012 | Shimomichi | |
| 2012/0162566 A1 | 6/2012 | Shimomichi | |
| 2012/0162567 A1 | 6/2012 | Shimomichi | |

FOREIGN PATENT DOCUMENTS

| | | |
|---|---|---|
| JP | H09-096811 A | 4/1997 |
| JP | H09-113709 A | 5/1997 |
| JP | H11-052368 A | 2/1999 |
| JP | 2001-184924 A | 7/2001 |
| JP | 2001-264752 A | 9/2001 |
| JP | 2002-174811 | 6/2002 |
| JP | 2002-279811 | 9/2002 |
| JP | 2003-036032 A | 2/2003 |
| JP | 2003-084681 A | 3/2003 |
| JP | 2004-163514 | 6/2004 |
| JP | 2006-039361 | 2/2006 |
| JP | 2006-208535 A | 8/2006 |
| JP | 2006-215390 A | 8/2006 |
| JP | 2007-026916 A | 2/2007 |
| JP | 2007-042338 A | 2/2007 |
| JP | 2007-163620 A | 6/2007 |
| JP | 2007-194067 A | 8/2007 |
| JP | 2007-265837 A | 10/2007 |
| JP | 2007-311327 | 11/2007 |
| JP | 4051469 B | 12/2007 |
| JP | 2008-123915 A | 5/2008 |
| JP | 2008-123931 A | 5/2008 |
| JP | 2008-171719 A | 7/2008 |
| JP | 2008-197166 A | 8/2008 |
| JP | 2009-009080 A | 1/2009 |
| JP | 2009-37213 | 2/2009 |
| JP | 2009-098310 A | 5/2009 |
| JP | 2009-104858 | 5/2009 |
| JP | 2009-129706 A | 6/2009 |
| JP | 2009-229510 A | 10/2009 |
| JP | 2010-009787 | 1/2010 |
| JP | 2010-500778 A | 1/2010 |
| JP | 2010-054718 | 3/2010 |
| JP | 2010-067439 | 3/2010 |
| JP | 2010-072261 A | 4/2010 |
| JP | 2010-072262 | 4/2010 |
| JP | 2010-073506 | 4/2010 |
| JP | 2010-078738 | 4/2010 |
| JP | 2010-085546 A | 4/2010 |
| JP | 2010-102919 | 5/2010 |
| JP | 2010-122429 A | 6/2010 |
| JP | 2010-177053 A | 8/2010 |
| JP | 2010-262292 A | 11/2010 |
| JP | 2013-061673 A | 4/2013 |
| WO | WO 2007/039975 | 4/2007 |
| WO | WO 2008/021268 | 2/2008 |
| WO | WO 2008/090646 A1 | 7/2008 |

OTHER PUBLICATIONS

Japanese Office Action mailed Jan. 24, 2012 in Japanese Patent Application No. 2010-290999.

Japanese First Office Action for corresponding Japanese Application No. 2010-291000, mailed Jan. 24, 2012, in 9 pages.

Japanese Office Action mailed Mar. 13, 2012 in Japanese Patent Application No. 2010-291096.

Japanese Final Office Action for corresponding Japanese Application No. 2010-291000, mailed Jul. 10, 2012, in 9 pages.

Japanese Office Action mailed Aug. 21, 2012 in Japanese Patent Application No. 2010-291095.

Japanese Office Action mailed Sep. 10, 2013 in Japanese Application No. 2012-266134.

* cited by examiner

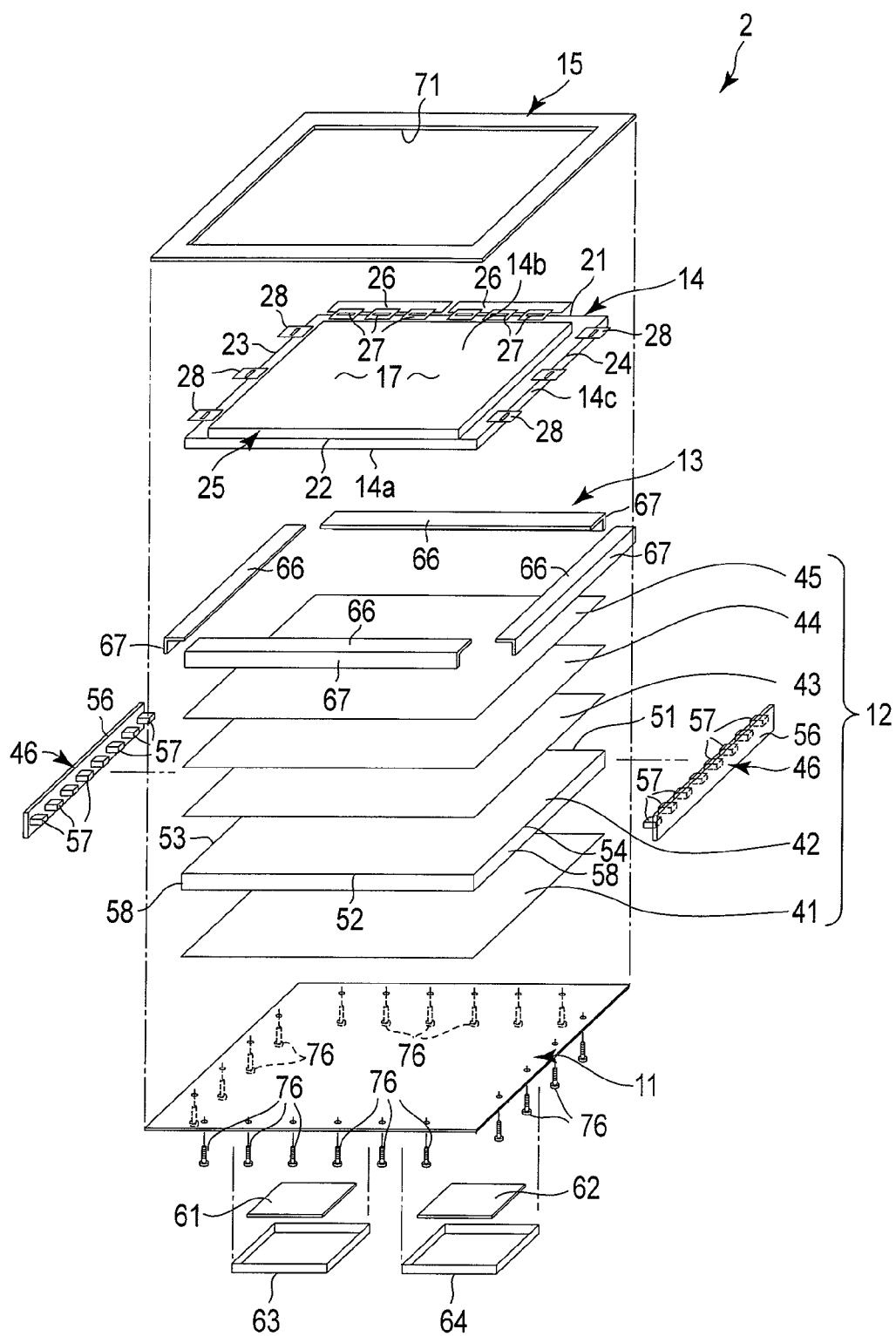
F I G. 3

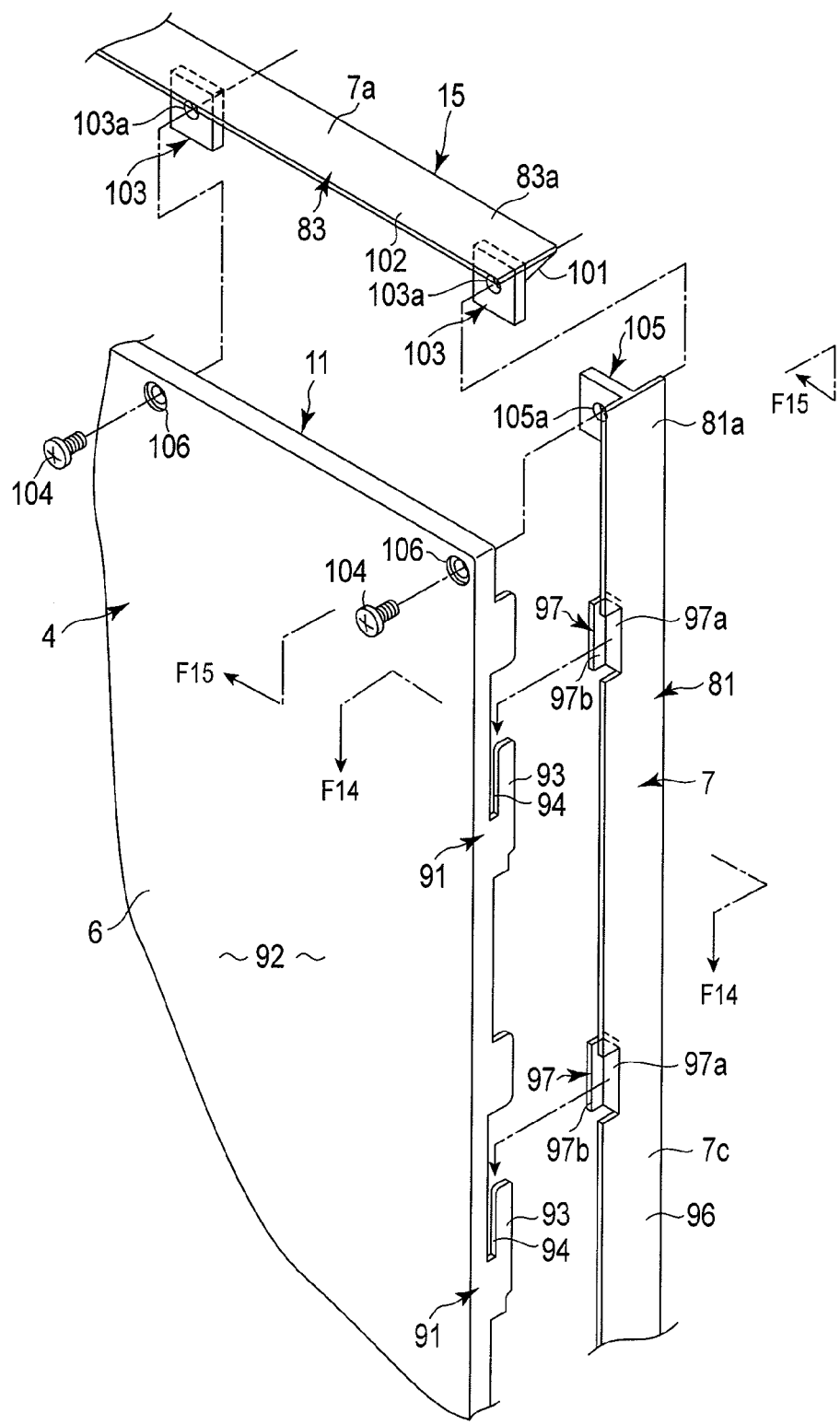
F I G. 13

TELEVISION AND ELECTRONIC APPARATUS

CROSS-REFERENCE TO RELATED APPLICATIONS

This application is a continuation of U.S. application Ser. No. 13/300,466, filed Nov. 18, 2011, which is based upon and claims the benefit of priority from Japanese Patent Application No. 2010-291096, filed Dec. 27, 2010, the entire contents of which are incorporated herein by reference.

FIELD

Embodiments described herein relate generally to a television and an electronic apparatus.

BACKGROUND

Some electronic apparatuses include a back cover and a front cover, which respectively cover the back and front surfaces of a panel.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary exploded perspective view schematically illustrating a configuration of the television illustrated in FIG. 1;

FIG. 13 is an exemplary perspective view illustrating divided parts of a television according to a second embodiment;

DETAILED DESCRIPTION

Various embodiments will be described hereinafter with reference to the accompanying drawings.

In general, according to one embodiment, an electronic apparatus comprises a panel comprising a first surface and a second surface opposite to the first surface, a first metal cover configured to cover the first surface of the panel, and a second metal cover comprising an opening configured to expose at least a part of the second surface of the panel. The second metal cover is configured to be attached to the first metal cover, surround a circumferential surface of the panel, and be outwardly exposed.

Hereinafter, embodiments will be described with reference to the drawings.

First Embodiment

FIGS. 1 to 12 disclose a television 1 according a first embodiment. The television 1 is an example of an electronic apparatus. The electronic apparatus to which the present embodiment can be applied is not limited to the television, but can be broadly applied to various electronic apparatuses, such as a notebook personal computer, a cellular phone, a smart phone, a personal digital assistant (PDA), and a game machine.

Figure 1:
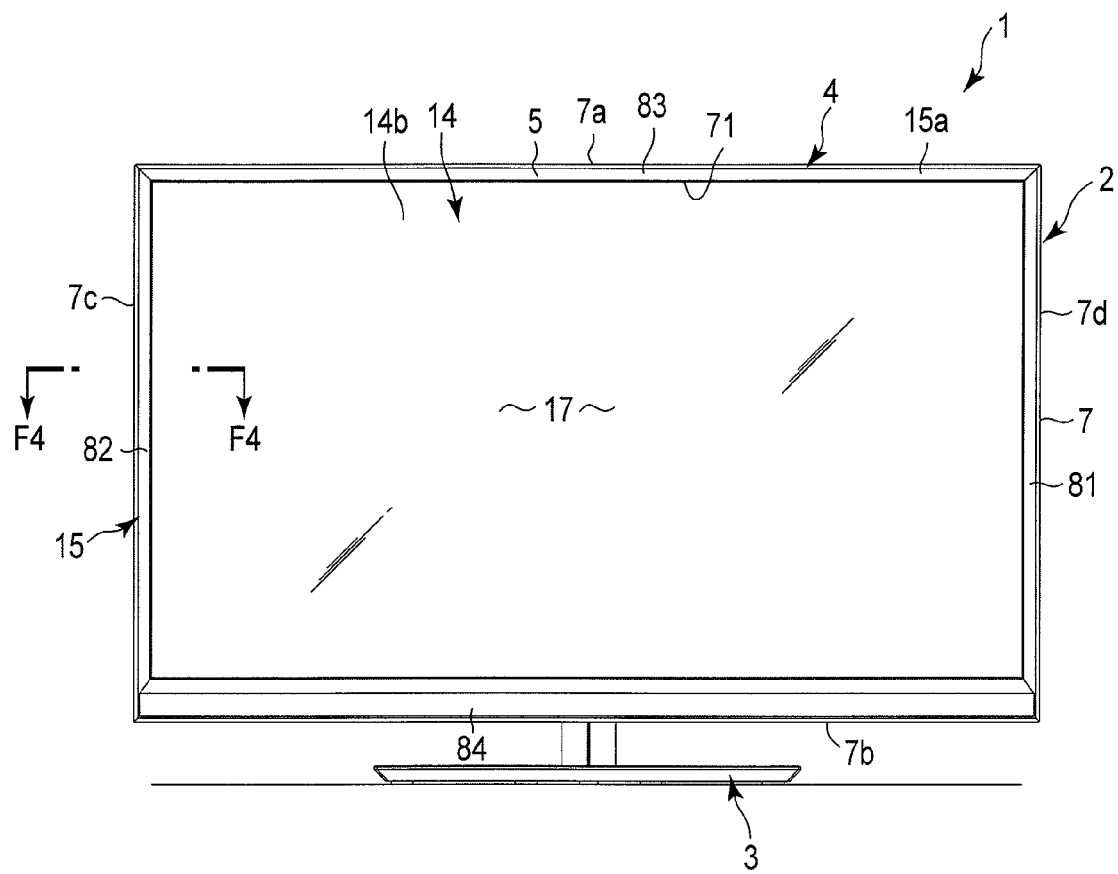
FIG. 1 is an exemplary front view of a television according to a first embodiment.
Figure 2:
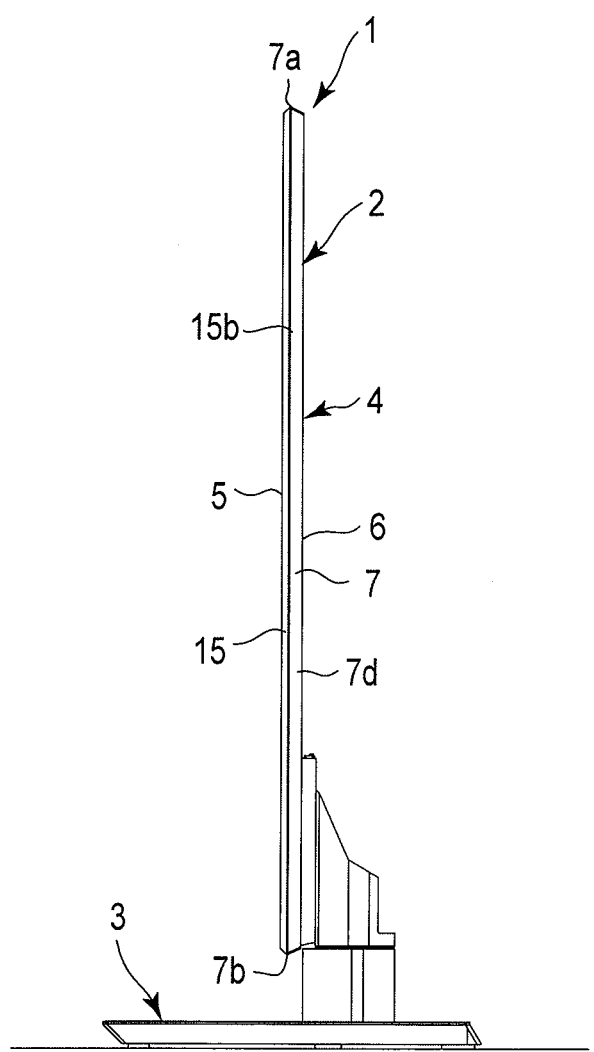
FIG. 2 is an exemplary side view of the television illustrated in FIG. 1.

As illustrated in FIGS. 1 and 2, the television 1 includes a display unit 2 and a stand 3. The stand 3 is placed on a television table, for example. The display unit 2 is formed in a flat shape and supported by the stand 3 in a state of standing substantially vertically.

The display unit 2 includes a housing 4. The housing 4 includes a front wall 5, a back wall 6, and a circumferential wall 7. The front wall 5 stands substantially vertically and faces users. The back wall 6 is disposed on a side opposite to the front wall 5 and stands substantially vertically to be substantially parallel to the front wall 5. The circumferential wall 7 connects the peripheral portion of the front wall 5 and the peripheral portion of the back wall 6.

The circumferential wall 7 includes an upper wall 7a, a lower wall 7b, a left side wall 7c (first side wall), and a right side wall 7d (second side wall). The upper and lower walls 7a and 7b extend substantially horizontally. The left and right side walls 7c and 7d extend substantially vertically. In this way, the housing 4 having a flat rectangular shape is formed.

As illustrated in FIG. 3, the television 1 includes a back cover 11, a backlight unit 12, a middle frame 13, a liquid crystal panel 14, and a front cover 15. The back cover 11 is an example of a "first metal cover." The front cover 15 is an example of a "second metal cover." The middle frame 13 is an example of a "frame". The liquid crystal panel 14 is an example of a "panel." The "panel" may be any panel other than the liquid crystal panel.

Figure 4:
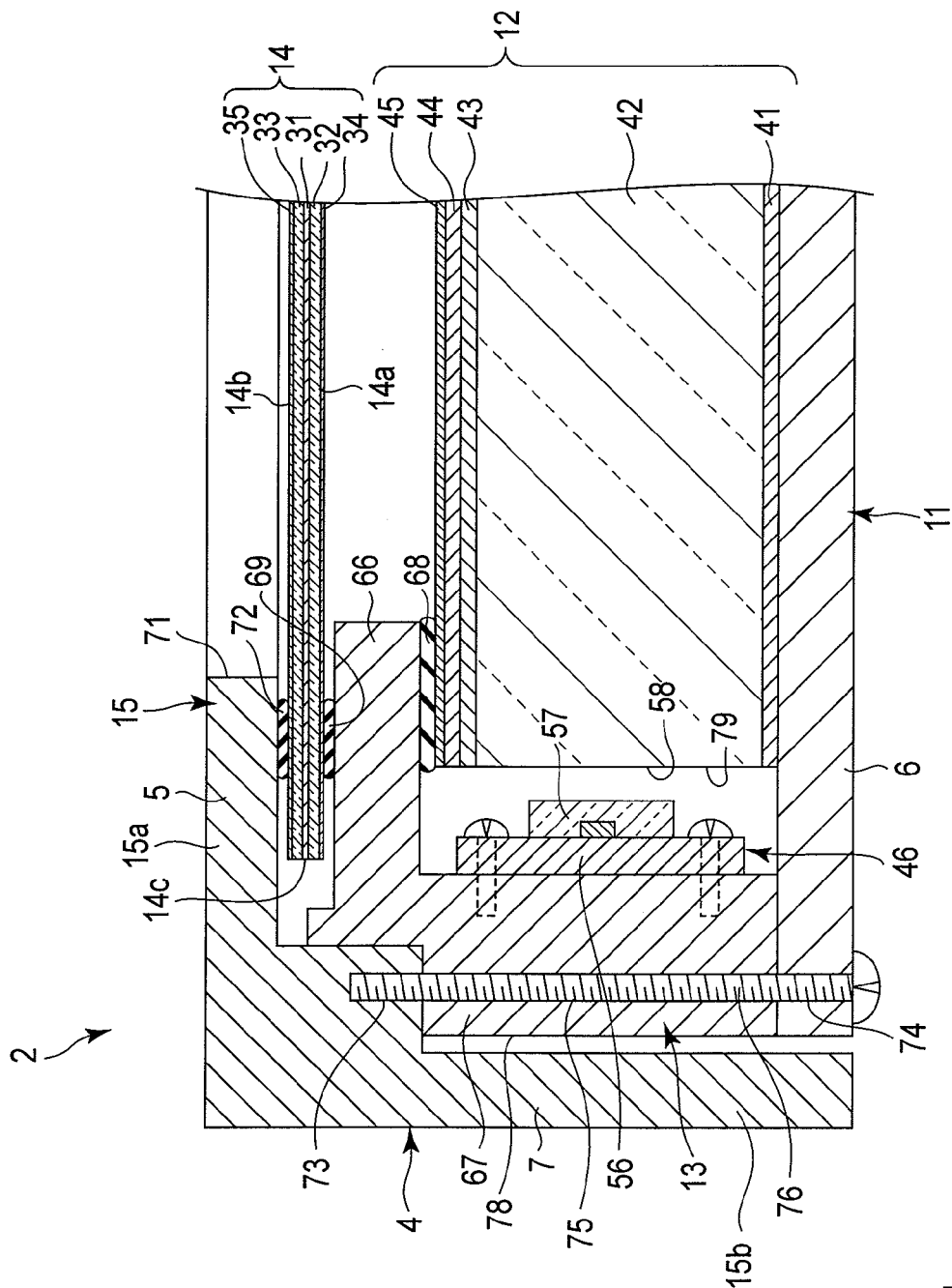
FIG. 4 is an exemplary cross-sectional view of the television taken along the line F4-F4 in FIG. 1.

As illustrated in FIGS. 3 and 4, the liquid crystal panel 14 includes a back surface 14a, a front surface 14b, and a circumferential surface 14c. The back surface 14a is an example of a "first surface." The front surface 14b is an example of a "second surface." The front surface 14b is disposed on a side opposite to the back surface 14a and includes a display screen 17. The circumferential surface 14c is an example of a "third surface." The circumferential surface 14c is positioned between the back surface 14a and the front surface 14b.

The liquid crystal panel 14 is formed in a rectangular shape having four sides 21, 22, 23, and 24. The four sides 21, 22, 23, and 24 include two long sides 21 and 22 and two short sides 23 and 24. As illustrated in FIG. 1, the liquid crystal panel 14 is accommodated in the housing 4 in a state where the two long sides 21 and 22 are oriented substantially horizontally.

As illustrated in FIG. 3, the liquid crystal panel 14 includes a panel unit 25, and a source board 26 and driver ICs 27 and 28 which are mounted on the panel unit 25. The driver IC 27 is a source chip-on-film (COF). The other driver IC 28 is a gate COF.

As illustrated in FIG. 4, the panel unit 25 includes a liquid crystal layer 31, two glass plates 32 and 33, and two polarizing plates 34 and 35 (polarization filters). The liquid crystal layer 31 is interposed between the two glass plates 32 and 33. Moreover, the two glass plates 32 and 33 are interposed between the two polarizing plates 34 and 35. In this way, the two polarizing plates 34 and 35 are at the outermost side of the liquid crystal panel 14 and are exposed to the outside. The polarizing plate 35 is positioned on the front surface 14b of the liquid crystal panel 14 so as to face the front cover 15.

As illustrated in FIG. 3, the backlight unit 12 faces the back surface 14a of the liquid crystal panel 14. The backlight unit 12 includes a reflector (reflective sheet) 41, a light-guide plate 42, first and second prism sheets 43 and 44, a polarizing sheet 45, and a pair of light bars 46.

The reflector 41 is stacked on the back surface of the light-guide plate 42. The first prism sheet 43 is stacked on the light-guide plate 42 from a side opposite to the reflector 41. The second prism sheet 44 is stacked on the first prism sheet 43. The polarizing sheet 45 is stacked on the second prism sheet 44. That is, the second prism sheet 44 is inserted between the first prism sheet 43 and the polarizing sheet 45.

The light-guide plate 42 has a rectangular shape corresponding to the liquid crystal panel 14. That is, the light-guide plate 42 has two long sides 51 and 52 and two short sides 53 and 54 and is accommodated in the housing 4 in a state where the two long sides 51 and 52 are oriented substantially horizontally.

As illustrated in FIG. 3, the light bars 46 include a circuit board 56 and a plurality of LEDs 57 mounted on the surface of the circuit board 56 and serves as a light source of the backlight unit 12. The light bars 46 are provided, for example, in a pair and are arranged to be divided on both sides of the light-guide plate 42. The light bars 46 are arranged along both the short sides 53 and 54 of the light-guide plate 42, respectively.

As illustrated in FIG. 4, the light-guide plate 42 has side surfaces 58 extending along the short sides 53 and 54. The light bars 46 face the side surfaces 58 of the light-guide plate 42. That is, the circuit board 56 is substantially parallel to the side surface 58 of the light-guide plate 42, and a plurality of LEDs 57 face the side surface 58 of the light-guide plate 42.

As illustrated in FIGS. 3 and 4, the back cover 11 has a larger size than the liquid crystal panel 14 and the backlight unit 12. The back cover 11 is formed of metal such as an aluminum alloy. The back cover 11 is provided on the back surface side of the backlight unit 12 and forms the back wall 6 of the housing 4.

The back cover 11 covers the backlight unit 12. More specifically, the back cover 11 covers the back surface 14a of the liquid crystal panel 14 with the backlight unit 12 disposed therebetween. As illustrated in FIG. 3, a controller board 61, an LED driver board 62, and shield housings 63 and 64 are mounted on the back surface of the back cover 11. The shield housings 63 and 64 cover the boards 61 and 62, respectively.

As illustrated in FIGS. 3 and 4, the middle frame 13 is interposed between the liquid crystal panel 14 and the backlight unit 12. The middle frame 13 is formed separately from the back cover 11 and the front cover 15. The middle frame 13 is formed of metal such as an aluminum alloy. The middle frame 13 is formed to be divided into four parts which correspond to the four sides 51, 52, 53, and 54 of the light-guide plate 42, respectively, for example. The middle frame 13 may be an integrated member having a frame shape.

As illustrated in FIG. 4, the middle frame 13 includes a supporting portion 66 and a fixing portion 67. The supporting portion 66 is interposed between the liquid crystal panel 14 and the backlight unit 12. An elastic member 68 such as rubber is provided between the supporting portion 66 and the backlight unit 12. The supporting portion 66 presses the backlight unit 12 toward the back cover 11. In this way, the backlight unit 12 is held between the back cover 11 and the middle frame 13.

Furthermore, the liquid crystal panel 14 is placed on the supporting portion 66 of the middle frame 13. An elastic member 69 such as rubber is provided between the supporting portion 66 and the liquid crystal panel 14. The supporting portion 66 supports the liquid crystal panel 14 with the elastic member 69 disposed therebetween.

The fixing portion 67 is provided at a position away from the position between the liquid crystal panel 14 and the backlight unit 12. The fixing portion 67 has a size corresponding to the distance between the back cover 11 and the front cover 15 and is sandwiched between the back cover 11 and the front cover 15. In this way, the middle frame 13 is held between the back cover 11 and the front cover 15.

As illustrated in FIG. 4, the light bars 46 are mounted on the middle frame 13 so as to face the side surfaces 58 of the light-guide plate 42. Specifically, the circuit board 56 of each of the light bars 46 is fixed, for example, by screwing, to the fixing portion 67 of the middle frame 13. In this way, the light bars 46 are thermally connected to the middle frame 13. That is, part of the heat generated by the light bars 46 is transferred to the middle frame 13.

As illustrated in FIG. 3, the front cover 15 has a larger size than the liquid crystal panel 14 and the backlight unit 12. The front cover 15 is formed of metal such as an aluminum alloy. The front cover 15 is provided on the front surface side of the liquid crystal panel 14 and is connected to the back cover 11 to form the front wall 5 and the circumferential wall 7 of the housing 4. The front cover 15 has a frame shape with an opening 71 through which the display screen 17 of the liquid crystal panel 14 is exposed. The front cover 15 is an example of an exterior member and is exposed to the outside of the television 1 to form a part of the external appearance of the television 1.

As illustrated in FIG. 4, the front cover 15 directly faces the polarizing plate 35 of the liquid crystal panel 14. An elastic member 72 such as rubber is provided between the front cover 15 and the polarizing plate 35. The front cover 15 supports the polarizing plate 35 with the elastic member 72 disposed therebetween. In this way, the liquid crystal panel 14 is held between the front cover 15 and the middle frame 13.

As illustrated in FIG. 4, the front cover 15 includes a threaded screw hole 73. The back cover 11 and the middle frame 13 include insertion holes 74 and 75, respectively, which correspond to the screw hole 73 of the front cover 15. A screw 76 is inserted through the insertion hole 74 of the back cover 11 and the insertion hole 75 of the middle frame 13 so as to engage with the screw hole 73. In this way, the back cover 11, the middle frame 13, and the front cover 15 are fastened by the screw 76.

The middle frame 13 is thermally connected to the back cover 11 and the front cover 15 which are formed of metal. In this way, part of the heat transferred from the light bars 46 to the middle frame 13 is transferred to the back cover 11 and the front cover 15 and dissipated to the outside of the television 1. The screw 76 which fastens the back cover 11, the middle frame 13, and the front cover 15 constitutes a part of a heat conduction path that thermally connects the back cover 11, the middle frame 13, and the front cover 15.

Figure 5:
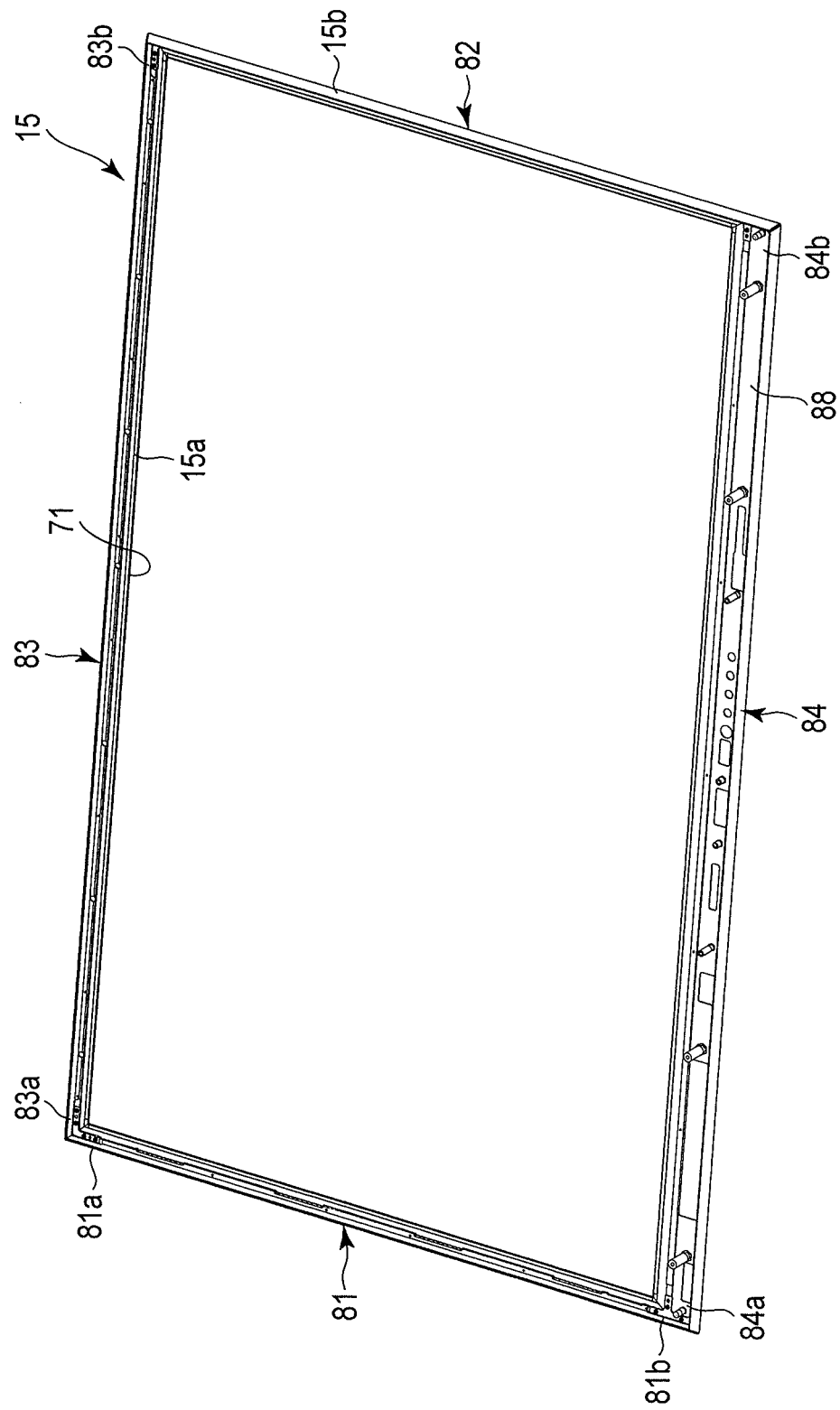
FIG. 5 is an exemplary perspective view of a front cover illustrated in FIG. 1.

As illustrated in FIGS. 4 and 5, the front cover 15 includes a first portion 15a that faces the front surface 14b of the liquid crystal panel 14 and a second portion 15b that is bent from the peripheral portion of the first portion 15a so as to extend backward. The second portion 15b has a size corresponding to substantially the entire thickness of the display unit 2. The front cover 15 surrounds the circumferential surface 14c of the liquid crystal panel 14, a circumferential surface 78 of the middle frame 13, and a circumferential surface 59 of the backlight unit 12. That is, the first portion 15a of the front cover 15 forms the front wall 5 of the housing 4. Furthermore, the second portion 15b of the front cover 15 forms the circumferential wall 7 of the housing 4.

As illustrated in FIG. 5, the front cover 15 is formed to be divided into four divided parts 81, 82, 83, and 84 which respectively correspond to the four sides 21, 22, 23, and 24 of the liquid crystal panel 14. The divided parts 81, 82, 83, and 84 of the present embodiment are connected to each other to form the frame-shaped front cover 15 and are then combined with the back cover 11.

The four divided parts 81, 82, 83, and 84 include a pair of first divided parts 81 and 82, a second divided part 83, and a third divided part 84. The first divided parts 81 and 82 correspond to the two short sides 23 and 24 of the liquid crystal panel 14, respectively. The second divided part 83 corresponds to the upper long side 21 of the liquid crystal panel 14. The third divided part 84 corresponds to the lower long side 22 of the liquid crystal panel 14.

Figure 6:
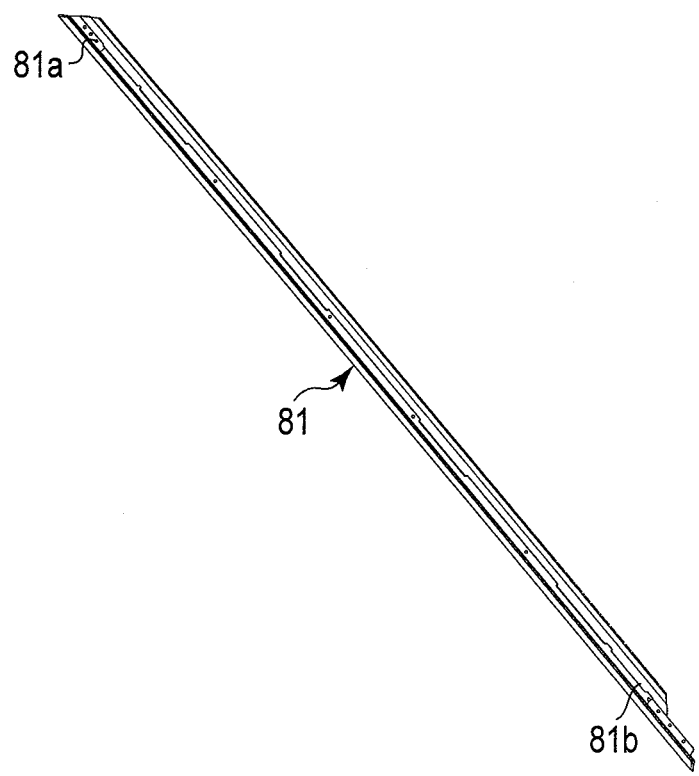
FIG. 6 is an exemplary perspective view of a first divided part illustrated in FIG. 5.

FIG. 6 illustrates the first divided part 81. The first divided part 82 has substantially the same structure as the first divided part 81, and description thereof will not be repeated. The first divided part 81 includes a first end portion 81a connected to the second divided part 83 and a second end portion 81b connected to the third divided part 84.

Figure 7:
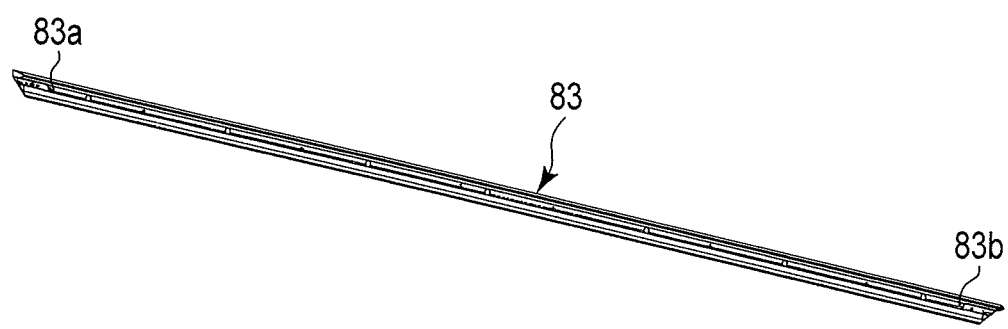
FIG. 7 is an exemplary perspective view of a second divided part illustrated in FIG. 5.
Figure 8:
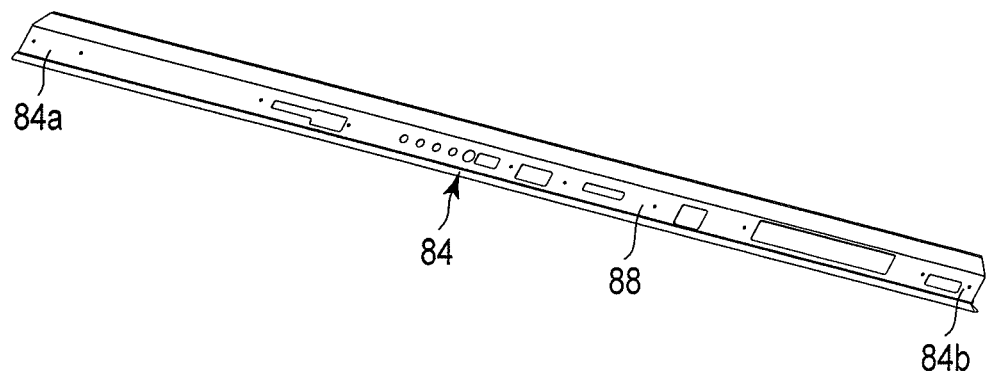
FIG. 8 is an exemplary perspective view of a third divided part illustrated in FIG. 5.

FIG. 7 illustrates the second divided part 83. The second divided part 83 includes end portions 83a and 83b connected to the first divided parts 81 and 82, respectively. FIG. 8 illustrates the third divided part 84. The third divided part 84 includes end portions 84a and 84b connected to the first divided parts 81 and 82, respectively.

Figure 9:
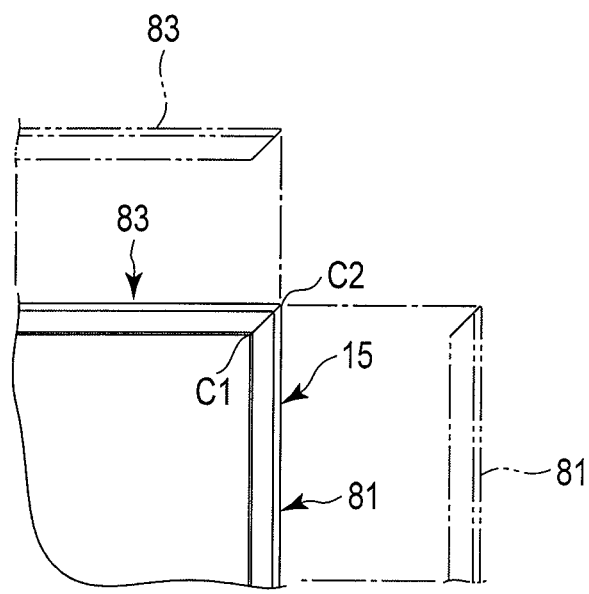
FIG. 9 is an exemplary plan view illustrating an example of assembling of the divided parts illustrated in FIG. 5.

FIG. 9 illustrates a joining portion between the first and second divided parts 81 and 83. The first and second divided parts 81 and 83 are divided by an oblique line that extends from a corner C1 of the opening 71 to an outer corner C2 of the front cover 15.

Figure 10:
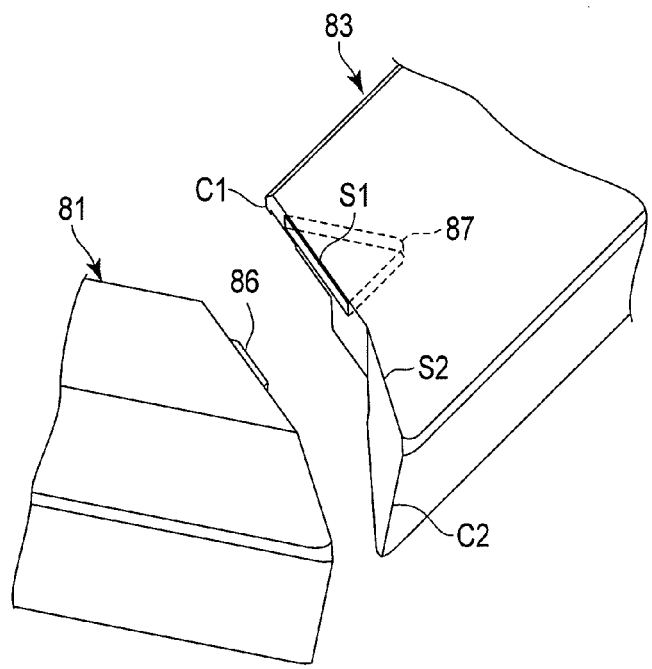
FIG. 10 is an exemplary perspective view illustrating an example of the coupling face of the divided parts illustrated in FIG. 5.

More specifically, as illustrated in FIG. 10, the dividing surface between the first and second divided parts 81 and 83 includes a first line S1 and a second line S2. The first line S1 extends from the corner C1 of the opening 71 to the midway of the first and second divided parts 81 and 83. The second line S2 is bent from the end of the first line S1 so as to extend up to the corner C2 of the front cover 15 in a direction crossing the first line S1. Since the dividing surface has the two lines S1 and S2 that extend in different directions, the first and second divided parts 81 and 83 are barely misaligned with each other when combined together.

Furthermore, as illustrated in FIG. 10, the first divided part 81 includes an engaging portion 86. The engaging portion 86 is a protrusion that protrudes toward the second divided part 83, for example. The second divided part 83 includes an engagement portion 87. An example of the engagement portion 87 is a slit in which the protrusion is inserted. When the engaging portion 86 of the first divided part 81 engages with the engagement portion 87 of the second divided part 83, the alignment of two parts can be smoothly realized, and they are hardly misaligned with each other when they are combined together.

The engagement portion 87 may be formed in the first divided part 81, and the engaging portion 86 may be formed on the second divided part 83. The first and second lines S1 and S2, the engaging portion 86, and the engagement portion 87 are also formed on the joining surface between the first and third divided parts 81 and 84.

The first divided parts 81 and 82 include a groove or a wall which extends in the longitudinal direction of the first divided parts 81 and 82 but does not include a groove or a wall which extends in a direction crossing the longitudinal direction. The second divided part 83 includes a groove or a wall which extends in the longitudinal direction of the second divided part 83 but does not include a groove or a wall which extends in a direction crossing the longitudinal direction. The first divided parts 81 and 82 and the second divided part 83 are formed in such a manner that the major part thereof is formed by extrusion and the detailed parts thereof are formed by cutting, for example.

Figure 11:
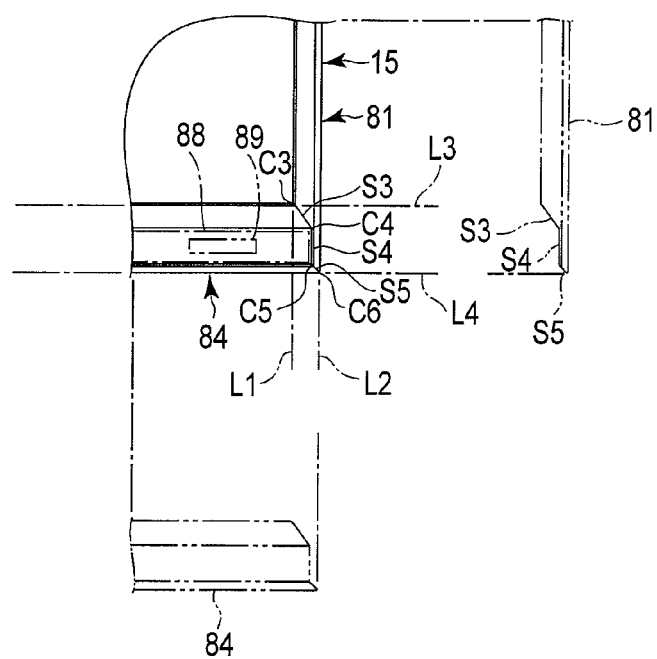
FIG. 11 is an exemplary plan view illustrating another example of assembling of the divided parts illustrated in FIG. 5.

FIG. 11 illustrates the joining portion between the first and third divided parts 81 and 84. The third divided part 84 includes a component accommodation region 88. The component accommodation region 88 defines a space between the third divided part 84 and the back cover 11, in which a functional component 89 is accommodated. Examples of the functional component 89 accommodated in the component accommodation region 88 include a speaker, a supporting member that supports the liquid crystal panel 14 or the backlight unit 12 from the bottom side, and various fixing members such as screws. However, the functional component 89 is not limited to these examples.

The dividing surface between the first and third divided parts 81 and 84 is divided into a first line S3 that extends from a corner C3 of the first opening 71 to a corner C4 of the component accommodation region 88, a second line S4 that extends along the component accommodation region 88, and a third line S5 that extends from the other corner C5 of the component accommodation region 88 to an outer corner C6 of the front cover 15.

That is, the first and third divided parts 81 and 84 are divided by a line that is away from the component accommodation region 88 in a region surrounded by the extension lines L1 and L2 of the two lateral sides extending in the longitudinal direction of the first divided part 81 and the extension lines L3 and L4 of the two lateral sides extending in the longitudinal direction of the third divided part 84.

The third divided part 84 includes a groove or a wall which extends in the longitudinal direction of the third divided part 84 but does not include a groove or a wall which extends in a direction crossing the longitudinal direction. The third divided part 84 is formed in such a manner that the major part thereof is formed by extrusion and the detailed parts thereof are formed by cutting, for example.

Figure 12:
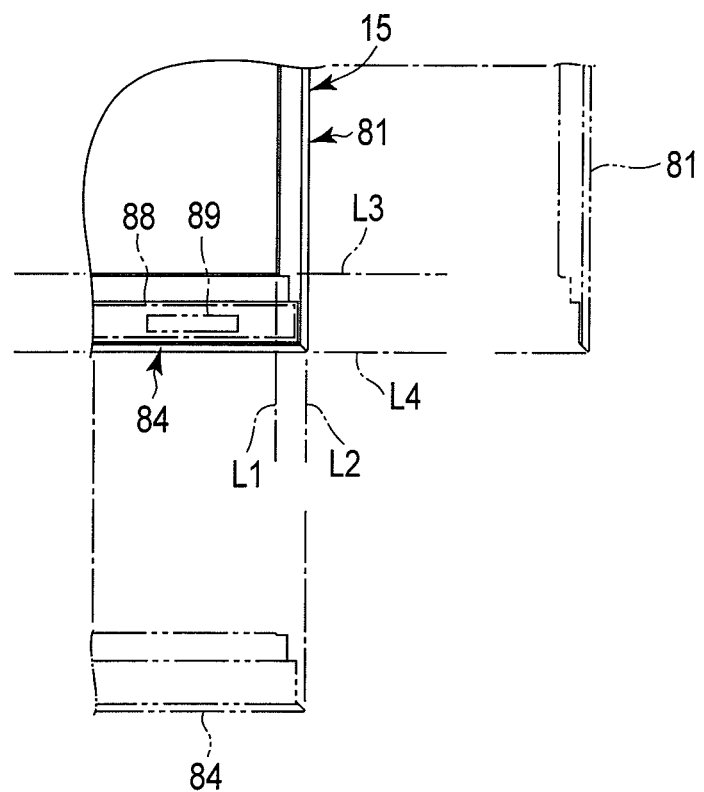
FIG. 12 is an exemplary plan view illustrating one modification of the divided parts illustrated in FIG. 5.

FIG. 12 illustrates a modification of the front cover 15. As illustrated in FIG. 12, the first and third divided parts 81 and 84 are divided in a region surrounded by the extension lines L1 and L2 of the two lateral sides extending in the longitudinal direction of the first divided part 81 and the extension lines L3 and L4 of the two lateral sides extending in the longitudinal direction of the third divided part 84. The first divided part 81 includes a groove or a wall which extends in the longitudinal direction of the first divided part 81 but does not include a groove or a wall which extends in a direction crossing the longitudinal direction. The third divided part 84 includes a groove or a wall which extends in the longitudinal direction of the third divided part 84 but does not include a groove or a wall which extends in a direction crossing the longitudinal direction. The first and third divided parts 81 and 84 are formed in such a manner that the major part thereof is formed by extrusion and the detailed parts thereof are formed by cutting, for example.

According to this configuration, it is possible to decrease the thickness of the television 1.

For comparison, an example of the television will be considered. Some televisions include a back cover formed of a synthetic resin, a front cover formed of a synthetic resin, and a panel set accommodated between the back cover and the front cover. The panel set includes a backlight unit, a middle frame formed of a resin, a liquid crystal panel, and a bezel formed of metal (hereinafter referred to as a metal bezel) for imparting strength to the panel set. The metal bezel has a frame shape, for example, so as to surround the edge portion of the liquid crystal panel and covers the four sides of the liquid crystal panel 14. The metal bezel is interposed between the liquid crystal panel and the front cover and is not exposed to the outside.

In contrast, the television 1 of the present embodiment includes the liquid crystal panel 14, the back cover 11 which is formed of metal and covers the back surface 14a of the liquid crystal panel 14, and the front cover 15 which is formed of metal and includes the opening 71 through which the front surface 14b of the liquid crystal panel 14 is exposed. The front cover 15 covers the circumferential surface 14c of the liquid crystal panel 14 and is connected to the back cover 11 and exposed to the outside.

That is, the television 1 of the present embodiment enables the metal bezel of the panel set to be eliminated by securing necessary strength using the back cover 11 and the front cover 15 which are formed of metal. That is, the television 1 of the present embodiment changes the way of thinking in which the strength of the panel set itself is secured by providing the metal bezel and proposes a new way of thinking in which the strength originally necessary for the panel set is imparted by the back cover 11 and the front cover 15, thereby securing the strength necessary for the whole apparatus, namely the television, rather than the individual units. In this way, the liquid crystal panel 14 and the front cover 15 can be placed closer to each other by at least a distance corresponding to the thickness of the metal bezel which is omitted, and the thickness of the television 1 can be decreased.

In the present embodiment, the front cover 15 faces the polarizing plate 35 of the liquid crystal panel 14 and supports the polarizing plate 35 with the elastic member 72 disposed therebetween. That is, since the liquid crystal panel 14 is directly supported by the front cover 15, the number of members necessary for fixing and holding the liquid crystal panel 14 can be decreased. This contributes to decreasing the thickness of the television 1.

In the present embodiment, the liquid crystal panel 14 and the backlight unit 12 are held by the front cover 15, the back cover 11, and the middle frame 13. With this configuration, the number of members necessary for fixing and holding the liquid crystal panel 14 and the backlight unit 12 can be decreased. This also contributes to decreasing the thickness of the television 1.

In the present embodiment, the middle frame 13 is formed of metal. With this configuration, since part of the strength necessary for holding the liquid crystal panel 14 and the backlight unit 12 is secured by the middle frame 13, the back cover 11 and the front cover 15 can be made thin. In this way, the thickness of the television 1 can be decreased further.

In the present embodiment, the fixing portion 67 of the middle frame 13 is sandwiched between the back cover 11 and the front cover 15. With this configuration, since the middle frame 13 can be held by the back cover 11 and the front cover 15, the number of members necessary for fixing and holding the middle frame 13 can be decreased. This also contributes to decreasing the thickness of the television 1.

In the present embodiment, the light bars 46 are mounted on the middle frame 13 so as to face the side surfaces 58 of the light-guide plate 42. With this configuration, the number of members necessary for fixing and holding the light bars 46 can be decreased. This also contributes to decreasing the thickness of the television 1.

The light bars 46 emit a large amount of heat. In the present embodiment, the light bars 46 are thermally connected to the middle frame 13. With this configuration, since the middle frame 13 formed of metal functions as a heat sink that dissipates part of the heat generated by the light bars 46, heat dissipation properties of the light bars 46 improve, and it is possible to omit, or decrease the size of, a heat sink provided exclusively for the light bars 46. This also contributes to decreasing the thickness of the television 1.

Furthermore, in the present embodiment, the middle frame 13 is thermally connected to the back cover 11 and the front cover 15 which are formed of metal. With this configuration, part of the heat generated by the light bars 46 is dissipated to the outside of the television 1 from the back cover 11 and the front cover 15. With this configuration, the heat dissipation structure of the light bars 46 can be simplified. This also contributes to decreasing the thickness of the television 1.

The liquid crystal panel 14 is vulnerable to heat, and for example, when it is heated in partial areas, images may appear differently in those areas. In the present embodiment, the elastic member 69 is provided between the middle frame 13 and the liquid crystal panel 14, so that a gap is formed between the middle frame 13 and the liquid crystal panel 14. The elastic member 69 makes the heat hard to be transferred from the middle frame 13 to the liquid crystal panel 14.

When the polarizing plate 34 of the liquid crystal panel 14 is expanded thermally too much, the function of the polarizing plate deteriorates. In the present embodiment, the elastic member 69 makes the heat hard to be transferred from the middle frame 13 to the polarizing plate 34. Similarly, the elastic member 68 makes the heat hard to be transferred from the middle frame 13 to the backlight unit 12. Furthermore, the elastic member 72 makes the heat hard to be transferred from the front cover 15 to the polarizing plate 35 of the liquid crystal panel 14.

In the present embodiment, the front cover 15 is formed to be divided into the four divided parts 81, 82, 83, and 84 which respectively correspond to the four sides 21, 22, 23, and 24 of the liquid crystal panel 14. With this configuration, material yield improves, and the cost can be decreased.

Second Embodiment

Next, a television 1 according to a second embodiment will be described with reference to FIGS. 13 to 15. Configurations having the same or similar functions as those of the configurations of the first embodiment will be denoted by the same reference numerals, and description thereof will not be repeated. Configurations other than those described below are the same as those of the first embodiment. In the present embodiment, the front cover 15 and the back cover 11 have a structure different from that of the first embodiment.

As illustrated in FIG. 13, the back cover 11 includes a plurality of engagement portions 91, for example, at the left and right ends portions thereof. The engagement portions 91 include a bent wall 93 standing with respect to a back surface 92 of the back cover 11 and a slit portion 94 formed in the bent wall 93. The slit portion 94 extends in a vertical direction along the short sides 23 and 24 of the liquid crystal panel 14. The slit portion 94 includes an open upper end in the vertical direction and a closed lower end blocked by the bent wall 93.

As illustrated in FIG. 13, the front cover 15 of the present embodiment includes the four divided parts 81, 82, 83, and 84 which are individually mounted on the back cover 11 in a disassembled state. First, the third divided part 84 is fixed to the back cover 11, for example, by screwing. Subsequently, the first divided parts 81 and 82 are fixed to the back cover 11.

Figure 14:
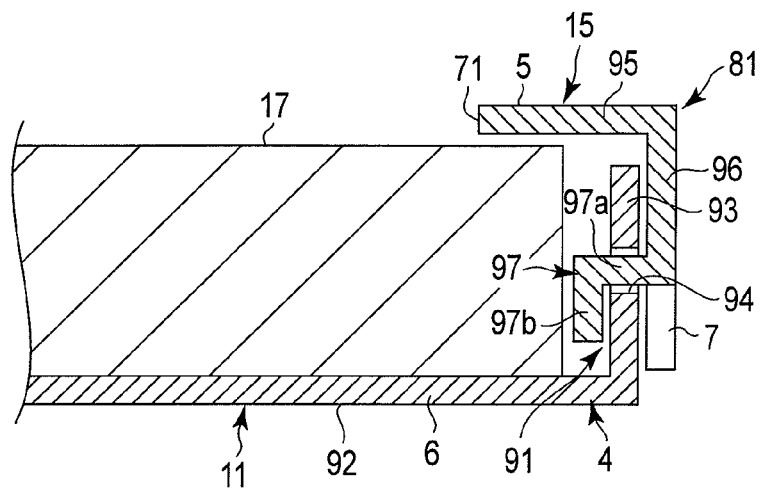
FIG. 14 is an exemplary cross-sectional view of the divided part taken along the line F14-F14 in FIG. 13.

As illustrated in FIGS. 13 and 14, each of the first divided parts 81 and 82 includes a first wall 95 that forms the first portion 15a of the front cover 15 and a second wall 96 that forms the second portion 15b of the front cover 15. On the second wall 96, hooks 97 are formed as engaging portions that engage with the engagement portions 91 of the back cover 11. The hooks 97 are configured to engage with the slit portions 94 of the engagement portions 91.

As illustrated in FIG. 14, the hooks 97 include a first portion 97a that is inserted into the slit portion 94 and a second portion 97b that is bent from the tip end of the first portion 97a so as to extend along the inner surface of the bent wall 93 of the back cover 11. The first divided part 81 is mounted on the back cover 11 by inserting the hooks 97 into the slits 94 and sliding the first divided part 81 along the short sides 23 and 24 of the liquid crystal panel 14.

The second divided part 83 is fixed to the back cover 11 after the first and third divided parts 81, 82, and 84 are mounted. As illustrated in FIGS. 13 and 15, the second divided part 83 includes a first wall 101 that forms the first portion 15a of the front cover 15 and a second wall 102 that forms the second portion 15b of the front cover 15. The second wall 102 includes a first protrusion 103 that protrudes into a space between the back cover 11 and the front cover 15. The first protrusion 103 includes a screw hole 103a so that a screw 104 is inserted through the screw hole 103a so as to be coupled with the back cover 11. The screw hole 103a is a threaded screw hole.

Figure 15:
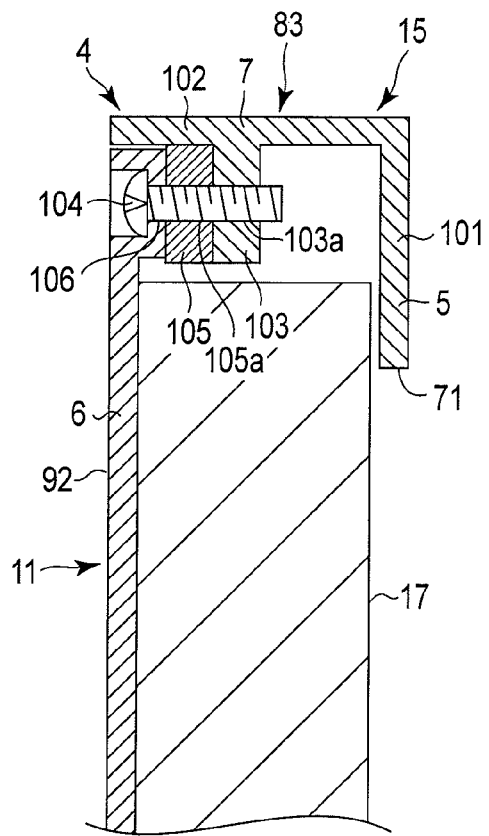
FIG. 15 is an exemplary cross-sectional view of the divided part taken along the line F15-F15 in FIG. 13.

As illustrated in FIGS. 13 and 15, each of the first divided parts 81 and 82 includes a second protrusion 105 which is interposed between the back cover 11 and the first protrusion 103 of the second divided part 83. The second protrusion 105 includes an insertion hole 105a through which the screw 104 is inserted. The back cover 11 includes an insertion hole 106 through which the screw 104 is inserted.

The screw 104 is inserted through the insertion holes 106 and 105a of the back cover 11 and the second protrusion 105 so as to engage with the screw hole 103a of the first protrusion 103. In this way, the back cover 11, the first and second divided parts 81 and 83 are fastened by the screw 104. In this way, the second divided part 83 is fixed to the back cover 11.

The end portions 83a and 83b of the second divided part 83 faces the first divided parts 81 and 82 from the top side. With this configuration, the first divided parts 81 and 82 are not removed toward the top side. The screw 104 engages with the screw hole 104 in a direction substantially perpendicular to the sliding direction of the first divided parts 81 and 82.

According to this configuration, similarly to the first embodiment, the thickness of the television 1 can be decreased.

In the present embodiment, the back cover 11 includes the slit portions 94 which extend along the short sides 23 and 24 of the liquid crystal panel 14. The first divided part 81 includes the hooks 97 which are configured to engage with the slit portions 94, and is mounted on the back cover 11 by inserting the hooks 97 into the slit portions 94 and sliding down the first divided part 81 along the short sides 23 and 24 of the liquid crystal panel 14.

With this configuration, it is possible to omit the screws necessary for fixing the first divided parts 81 and 82 or decrease the number of screws. The first divided parts 81 and 82 of the present embodiment can be mounted without using screws. According to this configuration, since the gap necessary between the liquid crystal panel 14 and the first divided parts 81 and 82 can be decreased, it is possible to decrease the horizontal width of the television 1.

In the present embodiment, the second divided part 83 includes the protrusion 103 that protrudes into a space between the back cover 11 and the front cover 15, and the first protrusion 103 includes the screw hole 103a so that the screw 104 is inserted through the screw hole 103a so as to be coupled with the back cover 11. According to this configuration, since the back cover 11 and the front cover 15 are fixed to each other by using the space between them, the thickness of the television 1 can be decreased further.

The embodiment is not limited to the embodiments described above but may be realized by modifying constituent elements in the implementing stage within a range without departing from the spirit of the invention. Moreover, various embodiments can be made by appropriately combining a plurality of constituent elements disclosed in the embodiments described above. For example, some constituent elements may be omitted from all the constituent elements disclosed in the embodiments. Furthermore, constituent elements in different embodiments may be combined appropriately.

The frame portion (the middle frame 13) may be integrated with any one of a first metal cover (the back cover 11) and a second metal cover (the front cover 15). The middle frame 13 can accelerate dissipation of heat as long as at least a portion where the light bars 46 are mounted is formed of metal, and the other portions may be formed of materials other than metal. Moreover, the whole middle frame 13 may be formed of materials other than metal. The shape of the middle frame 13 and the fixing structure thereof are not limited to those described above. The front cover 15 does not have to be divided into the four divided parts 81, 82, 83, and 84 but may be formed in a frame shape.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television comprising:
   a panel comprising a first surface, a second surface opposite to the first surface and a circumferential surface;
   a backlight unit configured to face the first surface of the panel;
   a first cover configured to cover the backlight unit and to form a part of an outline wall of the television;
   a second cover comprising an opening configured to expose the second surface of the panel, the second cover being configured to be attached to the first cover, to surround the circumferential surface of the panel, and to form a part of the outline wall of the television; and
   a frame comprising
      a first portion configured to be between the panel and the backlight unit, to support the backlight unit between the first portion and the first cover, and to support the panel between the first portion and the second cover,
      a second portion integrally formed with the first portion, the second portion configured to be in contact with the second cover, and
      a protrusion configured to face the circumferential surface of the panel.

2. The television of claim 1, wherein
   the first portion comprises a surface configured to support the panel, and
   the protrusion protrudes forwards further than the surface of the first portion.

3. The television of claim 1, wherein
   the second portion of the frame is configured to be contact with the second cover in a thickness direction of the panel.

4. The television of claim 1, further comprising an elastic member interposed between the second surface of the panel and the second cover.

5. The television of claim 1, wherein
   the second surface of the panel comprises a polarizing plate, and
   the second cover comprises an elastic member configured to support the polarizing plate in order to support the panel between the second cover and the frame.

6. The television of claim 1, further comprising a metal fixing member attached to the frame, wherein
   the frame and at least one of the first cover and the second cover are metallic,
   the backlight unit comprises a light bar configured to be thermally connected to the frame, and
   the metal fixing member is configured to penetrate through the frame to integrally attach and thermally connect the frame and at least one of the first cover and the second cover.

7. The television of claim 1, further comprising a metal fixing member attached to the frame, wherein
   the first cover, the second cover and the frame are metallic,
   the backlight unit comprises a light bar configured to be thermally connected to the frame, and
   the metal fixing member is configured to penetrate through the frame to integrally attach and thermally connect the frame, the first cover, and the second cover.

8. The television of claim 1, wherein
   the backlight unit comprises a light-guide plate and a light bar, the light bar being configured to be attached to the frame and face a side surface of the light-guide plate.

9. The television of claim 1, wherein
   the panel is rectangular and comprises four sides, and
   the second cover is configured to be four divided parts corresponding to the four sides of the panel, respectively.

10. The television of claim 9, wherein
    the four divided parts comprise a first divided part corresponding to a short side of the panel, and
    the first cover comprises a slit extending along the short side of the panel, the first divided part comprises a hook configured to engage with the slit, and the first divided part is configured to be attached to the first cover by inserting the hook into the slit and sliding along the short side of the panel.

11. The television of claim 10, wherein
    the four divided parts comprise a second divided part corresponding to a long side of the panel, and
    after the first divided part slides and is attached to the first cover with the hook engaging with the slit, the second divided part is combined with the first divided part from behind a sliding direction of the first divided part.

12. The television of claim 11, wherein
    the second divided part comprises a protrusion into a space between the first cover and the second cover, the protrusion comprising a hole configured to receive a screw attached to the first cover.

13. A television comprising:
    a housing comprising an outer wall of the television;
    a panel in the housing, the panel comprising a first surface, a second surface opposite to the first surface and a circumferential surface;
    a backlight unit in the housing, the backlight unit being configured to face the first surface of the panel; and
    a frame in the housing, wherein
    the housing comprises a first cover configured to cover the backlight unit and to be exposed to outside of the television, and a second cover comprising an opening configured to expose the second surface of the panel, the second cover being configured to be attached to the first cover, to surround the circumferential surface of the panel, and to be exposed to the outside of the television, and
    the frame comprises
       a first portion configured to be between the panel and the backlight unit, to support the backlight unit between the first portion and the first cover, and to support the panel between the first portion and the second cover,
       a second portion integrally formed with the first portion, the second portion configured to be in contact with the second cover, and
       a protrusion configured to face the circumferential surface of the panel.

14. The television of claim 13, wherein
    the first portion comprises a surface configured to support the panel, and
    the protrusion protrudes forwards further than the surface of the first portion.

15. The television of claim 13, wherein
    the second portion of the frame is configured to be in contact with an inner surface of the housing in a thickness direction of the panel.

16. The television of claim 13, further comprising an elastic member interposed between the second surface of the panel and an inner surface of the housing.

17. The television of claim 13, wherein
- the second surface of the panel comprises a polarizing plate, and
- the second cover comprises an elastic member configured to support the polarizing plate in order to support the panel between an inner surface of the housing and the frame.

18. The television of claim 13, further comprising a metal fixing member attached to the frame, wherein
- the frame and at least one of the first cover and the second cover are metallic,
- the backlight unit comprises a light bar configured to be thermally connected to the frame, and
- the metal fixing member is configured to penetrate through the frame to integrally attach and thermally connect the frame and at least one of the first cover and the second cover.

19. The television of claim 13, further comprising a metal fixing member attached to the frame, wherein
- the first cover, the second cover and the frame are metallic,
- the backlight unit comprises a light bar configured to be thermally connected to the frame, and
- the metal fixing member is configured to penetrate through the frame to integrally attach and thermally connect the frame, the first cover, and the second cover.

* * * * *